US010870951B2

(12) United States Patent
Karr et al.

(10) Patent No.: US 10,870,951 B2
(45) Date of Patent: Dec. 22, 2020

(54) PROTECTIVE FOAM LAYER FOR ACTIVITY SURFACES

(71) Applicant: TURF CUSHION INC, Dalton, GA (US)

(72) Inventors: John Karr, Ringgold, GA (US); Keith Pavlansky, Yadkinville, NC (US)

(73) Assignee: TURF CUSHION INC, Dalton, GA (US)

(*) Notice: Subject to any disclaimer, the term of this patent is extended or adjusted under 35 U.S.C. 154(b) by 42 days.

(21) Appl. No.: 16/148,000

(22) Filed: Oct. 1, 2018

(65) Prior Publication Data

US 2019/0276990 A1 Sep. 12, 2019

Related U.S. Application Data

(60) Provisional application No. 62/639,716, filed on Mar. 7, 2018.

(51) Int. Cl.

| E01C 13/02 | (2006.01) |
|---|---|
| A47G 27/02 | (2006.01) |
| B32B 5/18 | (2006.01) |
| B32B 5/02 | (2006.01) |
| B32B 5/24 | (2006.01) |
| B32B 37/18 | (2006.01) |
| B32B 5/32 | (2006.01) |
| B29C 48/00 | (2019.01) |
| B29L 7/00 | (2006.01) |

(52) U.S. Cl.
CPC .......... *E01C 13/02* (2013.01); *A47G 27/0212* (2013.01); *B29C 48/0012* (2019.02); *B29C 48/0022* (2019.02); *B29C 48/022* (2019.02); *B32B 5/022* (2013.01); *B32B 5/18* (2013.01); *B32B 5/245* (2013.01); *B32B 5/32* (2013.01); *B32B 37/182* (2013.01); *B29L 2007/002* (2013.01); *B32B 2266/025* (2013.01); *B32B 2471/00* (2013.01)

(58) Field of Classification Search
None
See application file for complete search history.

(56) References Cited

U.S. PATENT DOCUMENTS

| 4,501,420 A | 2/1985 | Dury |
| 5,052,158 A | 10/1991 | D'Luzansky |
| 8,979,663 B1 | 3/2015 | Breaker |
| 9,194,086 B1 * | 11/2015 | Karmie .................. B32B 25/10 |
| 2006/0141231 A1 | 6/2006 | Lemiuex |
| 2007/0042828 A1 * | 2/2007 | Krushke, Jr. ............. B32B 5/18 |
| | | 472/92 |

(Continued)

OTHER PUBLICATIONS

Non-Final Office Action, U.S. Appl. No. 15/931,638 (dated Sep. 11, 2020).

*Primary Examiner* — Chinessa T. Golden
(74) *Attorney, Agent, or Firm* — Robinson IP Law, PLLC

(57) ABSTRACT

Foam pads and method for making foam pads for use under an activity surface which meet or exceed G-max and HIC criteria under ASTM F1292-17 for playground equipment at heights of at least 9 to 12 feet and/or wherein the thickness loss of such pads at approximately one hour after removal of a 75 lb./in.² load applied to the pad at 25% deflection for one hour pursuant to ASTM D3575-08 Suffix B is less than 7%.

16 Claims, 3 Drawing Sheets

(56) References Cited

U.S. PATENT DOCUMENTS

| | | | |
|---|---|---|---|
| 2010/0041488 A1* | 2/2010 | Foxon | E01C 13/045 |
| | | | 472/92 |
| 2012/0036698 A1 | 2/2012 | Guertin | |
| 2012/0076979 A1* | 3/2012 | Svirklys | E01C 13/02 |
| | | | 428/136 |
| 2019/0282883 A1 | 9/2019 | Turner | |
| 2020/0070038 A1 | 3/2020 | Vachon et al. | |

* cited by examiner

PROTECTIVE FOAM LAYER FOR ACTIVITY SURFACES

CROSS-REFERENCE(S) TO RELATED APPLICATION(S)

This application claims priority to U.S. Provisional Patent Application Ser. No. 62/639,716 entitled "Turf Underlayment" which was filed on Mar. 7, 2018, the content of which is incorporated herein by reference in its entirety.

FIELD

This disclosure relates to the field of padding layers for surfaces such as playgrounds or athletic fields that utilize artificial turf.

BACKGROUND

Padding used beneath activity surfaces such as playgrounds and athletic fields are required to meet certain standards in order to be safe for people to use such activity surfaces. Different standard tests are available to test such padding to better ensure that such padding meets all such criteria. One such test is ASTM F1292-17 for playgrounds which involves both GMAX and Head Impact Criteria (HIC) categories. In order for a pad to pass this test for a specific drop height (height from which the head of a person could fall and hit the ground), the GMAX value must be less than 200 and the HIC value must be less than 1000. Therefore, the drop height determines how high playground equipment can be on a given playground. In order to pass these criteria for higher playground equipment, it is often necessary for manufacturers to make pads with greater thicknesses. However, thicker padding is undesirable because it requires more material and more space beneath an activity surface such as a playground. Therefore, it is more expensive than if less material were used.

Another problem with conventional pads used under activity surfaces is that many such pads are made of composite materials. For some pads, foam chips are laid out on a carrier fabric in various sizes, densities and colors. A light lamination element is typically added and then the entire piece is heat molded into shape. Because of the heterogeneity of the pad, variations in density occur throughout the pad as well as height variations. The height variations of a conventional composite pad can be as much as 0.5 inches and contribute to installation problems and uneven wear of the overall activity surface and underlying padding. Another problem is that GMAX and HIC ratings are not consistent across such pads because the pads are not made of homogeneous material. This inconsistency requires thicker padding to better ensure that each section of a pad meets the necessary GMAX and HIC criteria.

What is needed, therefore, is a pad and method for making such pad that overcomes the drawbacks of conventional activity surface padding.

SUMMARY

The above and other needs are met by a protective energy absorbing extruded polyolefin foam layer that is positioned under a layer of artificial turf or other similar surface layer and is used to absorb the energy of impacts from projectiles like golf balls, or to absorb the impact of accidental falls by people and therefore prevent injuries to such people playing on the surface layer. The resilient nature of the extruded polyolefin foam lends itself to an application where there will be multiple impacts over an indefinite period of time, and its ability to absorb the energy of those impacts will not degrade over the useful life of the product. The stable nature of the extruded polyolefin foam is extremely homogeneous and possesses energy absorbing properties that are predictable and consistent at any location of the protective layer. Because it is possible to maintain strict process control during the extrusion process of polyolefin foamed plastics like linear polyethylene or polypropylene, the energy absorbing properties of the extruded foam can be repeated from one production run to the next.

In a preferred embodiment, a foam pad is disclosed comprising a pad having (1) a density ranging from about 0.5 pound per cubic foot (lb./ft$^3$) and about 4 lb./ft$^3$, (2) a thickness ranging from about 0.5 inches to about 3 inches, and (3a) an HIC rating of less than 1000 and a G-max rating of less than 200 based on ASTM F1292-17 at a maximum fall height of from about 9 feet to about 12 feet and/or (3b) wherein the thickness loss of the pad at approximately one hour after removal of a 75 lb./in.$^2$ load applied to the pad at 25% deflection for approximately one hour pursuant to ASTM D3575-08 Suffix B is less than 7%.

In one embodiment the pad described above has a composition of at least 95% by weight polyethylene. In a different embodiment the pad has a composition of at least 70% by weight polyethylene and from about 20% by weight to about 30% by weight of a plant-based polyol, crosslinked polypropylene, crosslinked polyethylene or combinations thereof. In one related embodiment, more than 50% by weight of the polyethylene used is recycled polyethylene. In yet another related embodiment, more than 60%, more preferably more than 70%, and most preferably more than 80% by weight of the polyethylene used is recycled polyethylene. In another related embodiment more than 90% by weight of the polyethylene used is recycled polyethylene. In one embodiment, substantially all of the polyethylene used is recycled polyethylene.

In one example, the maximum fall height used with ASTM F1292-17 testing is at least 10 feet.

In another example, the foam pad has a density ranging from about 1.25 lb./ft$^3$ to about 1.75 lb./ft$^3$.

In yet another example, the foam pad includes a plurality of drainage holes extending through the thickness of the foam pad wherein the drainage rate of the pad is at least 35 gallons per square yard per hour.

In another aspect, embodiments of the disclosure provide a method of making a foam pad for use under an activity surface. The method preferably includes the steps of (a) extruding a composition comprising at least 70% by weight polyolefin or combination of polyolefins through a die to form foam; (b) adding a blowing agent to the foam so that the foam expands to a thickness of from about 0.5 inches to about 2.5 inches and a width ranging from about 45 inches to about 55 inches and wherein the expanded foam has a density ranging from about 0.5 lb./ft$^3$ to about 4 lb./ft$^3$; (c) cooling the foam either actively or passively wherein the outer surfaces of the foam cure to a hardened state; and (d) cutting the foam to form a foam sheet having a length ranging from about 100 inches to about 140 inches.

In one version of the method described above, the extruded composition includes at least about 95% polyethylene. In the same or a related embodiment, the expanded foam is cut to a length ranging from about 110 inches to about 130 inches. In the same or a related embodiment, the foam expands to a thickness of from about 1.5 inches to about 2 inches. In the same or a related embodiment, the expanded foam has a density ranging from about 1 lb./ft³ to about 2 lb./ft³.

In the same or different version of the method described above, the extruded composition is heated to a maximum temperature of from about 380° F. to about 400° F. and then the resulting foam is cooled to less than about 170° F. prior to cutting.

In the same or a related embodiment of the method described above, the extruded composition comprises at least 70% by weight polyethylene and from about 20% by weight to about 30% by weight of a plant-based polyol, crosslinked polyethylene, crosslinked polypropylene, or combinations thereof.

The methods described above may further include the step of cutting the foam sheet to a length of from about 50 inches to about 70 inches to form a first foam pad and a second foam pad. As an additional option, a nonwoven layer can be combined with one or both of the foam pads. One version of this method further includes the step of drilling a plurality of drainage holes through at least one of the foam pads. In the same or different embodiment, the first foam pad is laminated to the second foam pad.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
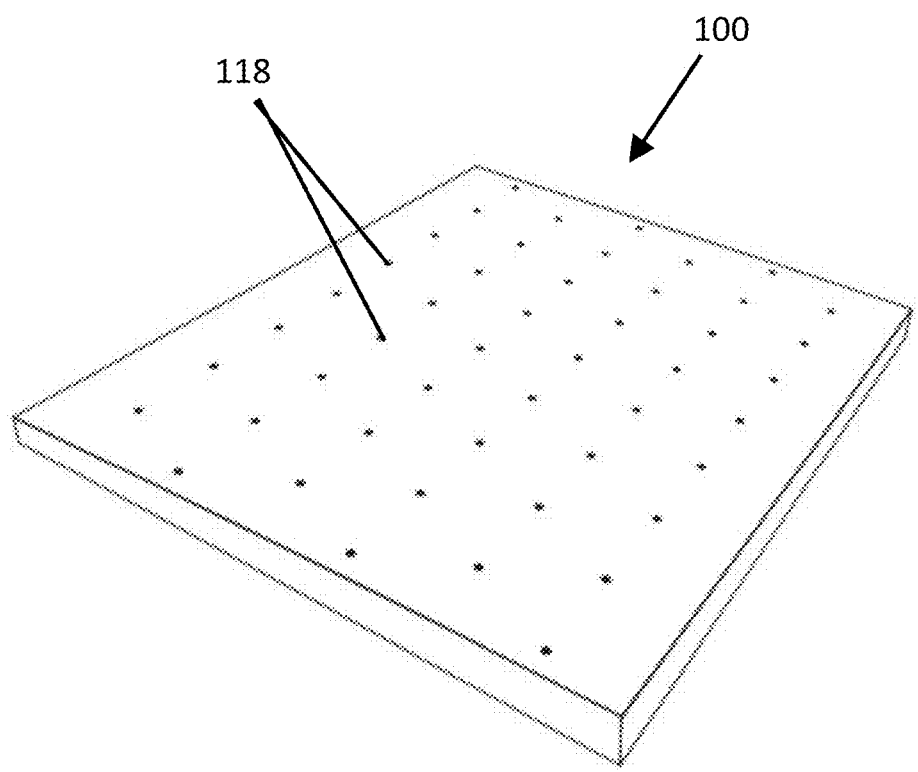
FIG. 1 shows a drawing of an example of a foam pad as disclosed herein.
Figure 2:
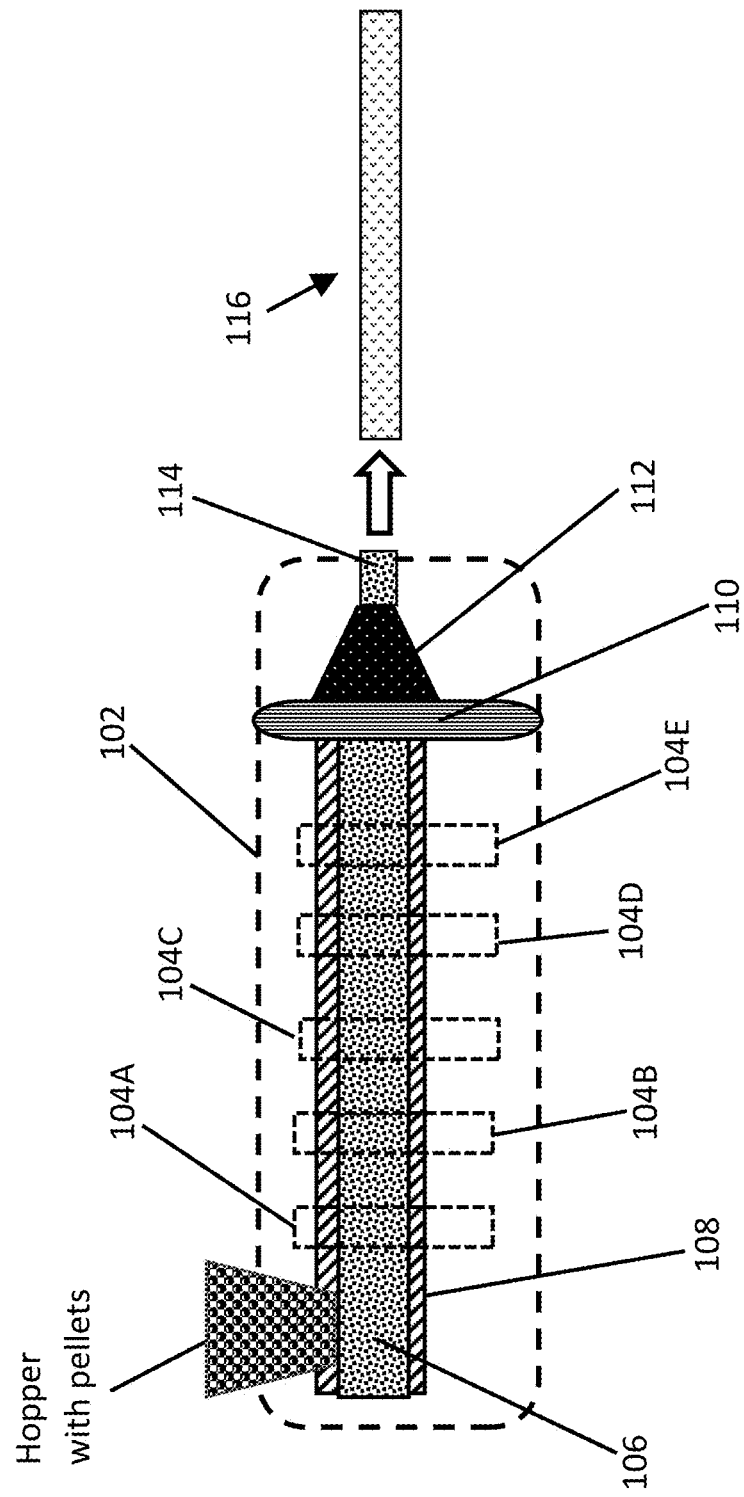
FIG. 2 shows a schematic drawing of an extrusion process.
Figure 3:
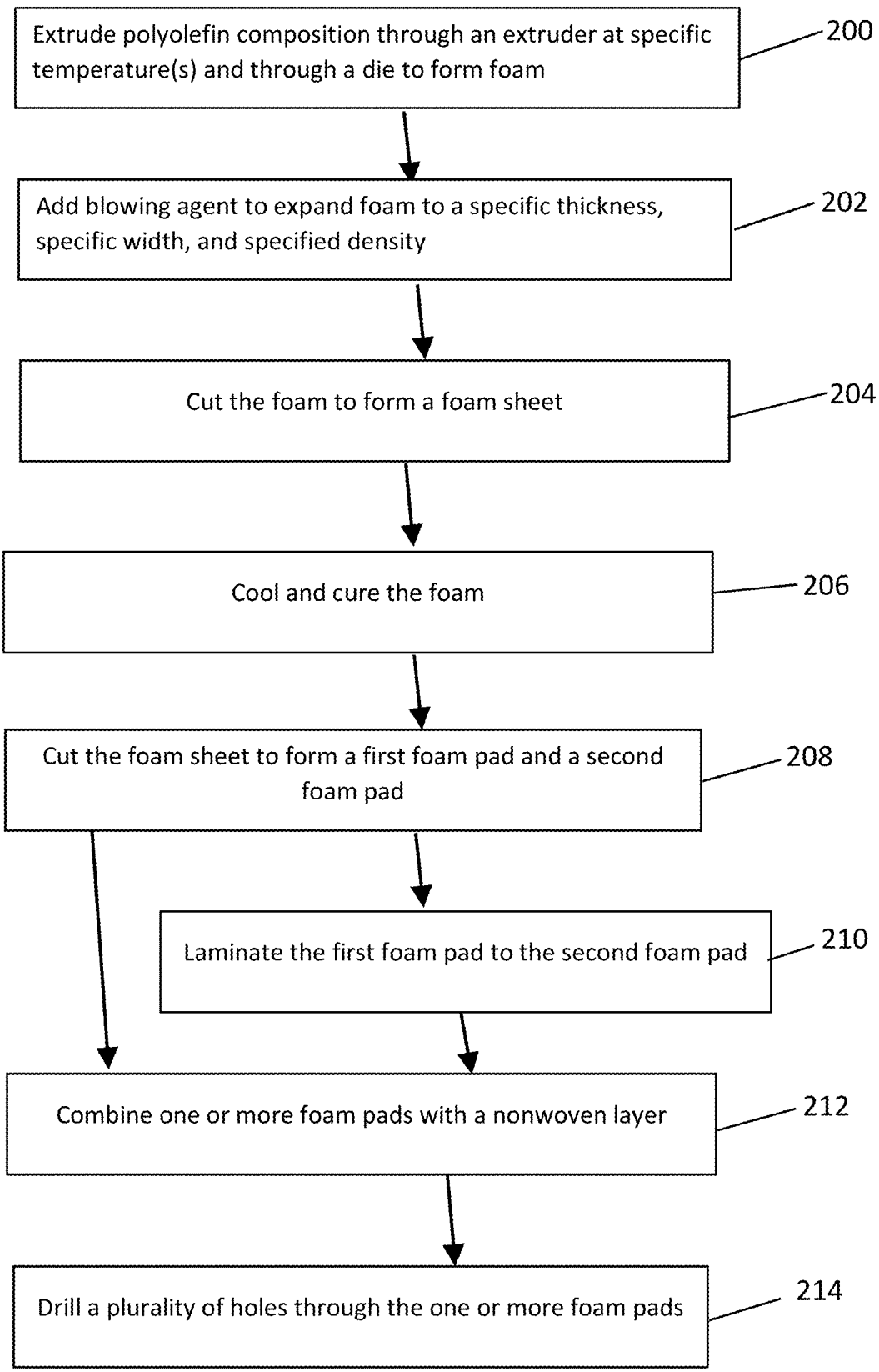
FIG. 3 shows method steps for manufacturing a foam pad like the one shown in FIG. 1.

FIG. 1 shows a drawing of a foam pad 100 as described herein. The foam pad 100 is made through an extrusion process shown schematically in FIG. 2 wherein a polyolefin is sent through an extruder 102. Preferably, the polyolefin is linear closed cell polyethylene and examples of such product include Sealed Air Ethafoam 150 or Ivex polylaminate. However, cross-linked polyethylene can also be used as well as polypropylene. The foam pad 100 preferably has a foam density ranging from about 0.5 pound per cubic foot (lb./ft³) to about 4 lb./ft³, more preferably from about 1 lb./ft³ to 3 lb./ft³, even more preferably from about 1.25 lb./ft³ to 1.75 lb./ft³, and most preferably about 1.5 lb./ft³. The thickness of the foam pad 100 preferably ranges from about 0.5 inches to about 3 inches, more preferably from about 1 inch to about 2.5 inches, and most preferably from about 1.5 inches to about 2 inches. Importantly, the foam pad 100 passes the ASTM F1292-17 test standard for specification for impact attenuation of surface systems under and around playground equipment at drop heights ranging from about 9 feet to about 12 feet and the foam pad 100 has excellent compression and recovery characteristics as evidenced by test results using ASTM D3575-08.

Regarding ASTM F1292-17, a 2-inch-thick foam pad 100 was tested by Professional Testing Laboratory, Inc. based in Dalton, Ga. The foam pad 100 was tested under landscape turf with urethane scrape coat backing with 4 pounds per square foot of sand infill. The foam pad 100 was placed over 4 inches of aggregate which was set over a 4-inch-thick concrete slab. Each sample for testing was acclimated for a minimum of 24 hours in each respective condition. NIST Traceable temperature sensors were inserted into the sample to ensure the correct temperature was achieved through the matrix. Testing was commenced within one minute of removal from the acclimation chambers. The specimen was impacted at a specified velocity with a missile of given mass of 10.1 pounds and geometry similar to a human head. A transducer mounted in the missile monitored the acceleration time history of the impact, which was recorded with the aid of an oscilloscope or other recording device. The headform missile was dropped at the requested height of at least 10 feet. G-max and Head Injury Criterion (HIC) are adopted as the criteria of injury risk with attenuation material on the ground for children 3 to 14 years of age. G-max is defined as the maximum acceleration of a missile during an impact expressed in G units. The HIC is defined as a specific integral of the acceleration-time history of an impact wherein HIC is used to determine relative risk of head injury. An equation for determining HIC is shown as Equation 1 below.

$$HIC = \left\{ \left[ \frac{1}{t_2 - t_1} \int_{t_1}^{t_2} a(t)dt \right]^{2.5} (t_2 - t_1) \right\}_{max} \quad \text{Equation 1}$$

In Equation 1, $t_1$ is an initial time, $t_2$ is a final time, a is acceleration measured as standard gravity acceleration.

The G-max values and HIC were recorded for three drops. The second and third drops were averaged. Testing was conducted at three temperatures as listed on the results shown in Table 1 below. The maximum criterion for passing a specified drop height is 200 G-max or 1,000 HIC. The tested assembly meets the criterion of performance of the IPEMA (International Play Equipment Manufacturers Association) suggested least favorable impact position at a 10.0-foot fall height according to section 4.2 of ASTM F1292-17.

TABLE 1

| Tested at 25° F. | DROP 1 | DROP 2 | DROP 3 | AVERAGE OF DROPS 2 and 3 |
|---|---|---|---|---|
| GMAX | 145 | 151 | 153 | 152 |
| HIC | 911 | 928 | 940 | 924 |

*Submitted samples subjected to a theoretical drop height of 11.0 feet.

| Tested at 72° F. | DROP 1 | DROP 2 | DROP 3 | AVERAGE OF DROPS 2 and 3 |
|---|---|---|---|---|
| GMAX | 125 | 122 | 144 | 133 |
| HIC | 913 | 855 | 1081 | 968 |

*Submitted samples subjected to a theoretical drop height of 11.0 feet.

| Tested at 120° F. | DROP 1 | DROP 2 | DROP 3 | AVERAGE OF DROPS 2 and 3 |
|---|---|---|---|---|
| GMAX | 142 | 144 | 140 | 142 |
| HIC | 1008 | 995 | 957 | 976 |

*Submitted samples subjected to a theoretical drop height of 10.0 feet.

The foam layer can maintain operational absorption of energy and will quickly return to its original shape in temperatures ranging from −20° F. to 180° F. Based on ASTM D3575-08, the foam pad 100 has average physical characteristics as shown below in Table 2. Table 2 also shows that a 2-inch thick version of the foam pad 100 meets or exceeds the ASTM F1292-17 standards for G-max and HIC with a drop height of up to 12 feet. A 1.5-inch-thick version of the foam pad 100 meets or exceeds the ASTM F1292-17 standards for G-max and HIC with a drop height of up to 9 feet.

TABLE 2

| | | Average Results | |
|---|---|---|---|
| Physical Properties | Test Method | 2.0 Inch Thickness | 1.5 Inch Thickness |
| Compressive Strength (vertical @ 25%) | ASTM D3575-08 Suffix D | 7 pounds per square inch (PSI) | 7 PSI |
| Compressive Strength (vertical @ 50%) | ASTM D3575-08 Suffix D | 14 PSI | 14 PSI |
| Compressive Set | ASTM D3575-08 Suffix B | <20% | <20% |
| Tensile Strength (0.5 in. thickness) | ASTM D3575-08 Suffix T | 23 PSI | 23 PSI |
| Tear Resistance (across grain; 0.5 in. thickness) | ASTM D3575-08 Suffix G | 7 pounds per inch (lb./in.) | 6 lb./in. |
| Cell Size | ASTM D3576-04 | 2.5 millimeters (mm) | 2.5 mm |
| Water Absorpotion | ASTM D3575-08 | <0.3 pounds per cubic foot (lb./ft$^3$) | <0.3% lb./ft$^3$ |
| Thernal Stability | ASTM D3575-08 Suffix S | <2% | <2% |
| G-max | ASTM F1292-17 | Up to 12 feet | Up to 9 feet |
| HIC | ASTM F1292-17 | Up to 12 feet | Up to 9 feet |

Compression recovery is an important aspect for pads used under activity surfaces and the quantifiable level of resiliency is determined by measuring the thickness (or height) of a pad after it has been exposed to a load for a specific period of time. For example, if a two-inch-thick pad returns to a full two inches of thickness after testing within a specified period of time, the recovery would be considered 100% and the "loss" (hereinafter referred to as a "thickness loss") would be considered 0%. If, on the other hand, the pad only returns to a thickness of 1.8 inches, the recovery would be considered 90% and the thickness loss would be considered 10%. Professional Testing Laboratory, Inc. based in Dalton, Ga. tested a 2-inch thick version of the foam pad 100 pursuant to and using ASTM D3575-08 Suffix B. A portion of the pad 100 was subjected to a static load of 75 pounds per square inch (lb./in.$^2$) for a one-hour period of time. A two inch by two inch (4 in.$^2$) square plate was used to apply pressure to the pad 100. Thickness measurements of the pad 100 were taken before the load was applied (measured to be 2.196 inches), immediately after the load was removed (measured to be 1.888 inches), and at one hour after removal of the load (measured to be 2.055 inches. Therefore, the thickness loss immediately following removal of the load was approximately 14% and the thickness loss after one hour was approximately 6.4%. In a related test, samples of the pad 100 were measured using a 25% deflection and varied recovery times using relevant portions of ASTM D3575-08 Suffix B. Immediately following removal of the 75 lb./in.$^2$ load, the thickness loss was measured at 9.11%. At one hour after removal of the load, the thickness loss was measured at 6.3%. At two hours after removal of the load, the thickness loss was measured at 5.8%, and at three hours after removal of the load the thickness loss was measured at 3.4%.

Regarding the extrusion process for extruding the foam pad 100, an example of such extruder 102 would be a Gloucester 4.5-inch×6.5-inch preferably having five heating zones (104A, 104B, 104C, 104D, and 104E). In a first step 200 of a preferred embodiment, after being fed from a hopper, a high pressure, low density resin 106 (preferably polyethylene) is forced through the extruder 102 with a melt index of 25 grams per 10 minutes wherein the extruder 102 heats the resin to a temperature preferably ranging from about 320° F. to about 400° F. An example of such resin is available from Nova Chemicals under the product name Novapol. The temperature profile of the referred five heating zones is preferably about from about 330° F. to about 350° F., more preferably from about 335° F. to about 345° F., and most preferably about 340° F. in a first heating zone 104A. The temperature of the second heating zone 104B is preferably from about 350° F. to about 370° F., more preferably from about 355° F. to about 365° F., and most preferably about 360° F. The temperature of the third heating zone 104C is preferably from about 370° F. to about 390° F., more preferably from about 375° F. to about 385° F., and most preferably about 380° F. The temperature of the fourth heating zone 104D is preferably from about 390° F. to about 410° F., more preferably from about 395° F. to about 405° F., and most preferably about 400° F. The temperature of the fifth heating zone 104E is preferably the same as the temperature in the third heating zone.

The molten resin 106 is pushed through the extruder 102 using a long screw 108 at an extrusion rate of from about 9 inches to about 13 inches per second and more preferably about 11 inches per second, and most preferably about 10.8 inches per second. In one embodiment, the composition of the molten resin is at least 95% by weight polyethylene, more preferably at least 98% by weight polyethylene, and most preferably about 100% by weight polyethylene. In a related embodiment, at least about 65% of the polyethylene used is recycled polyethylene. In yet another embodiment, the molten resin composition includes about 75% by weight polyethylene and about 25% by weight cross-linked polypropylene. In another embodiment, the molten resin composition includes from about 70% by weight to about 80% by weight polyethylene and from about 20% by weight to about 30% by weight of a plant-based polyol (e.g., "I'm Green" polyethylene bio-based resin available from Sealed Air Corporation/Braskem). In a similar embodiment, the molten resin composition includes from about 70% by weight to about 75% by weight polyethylene and from about 25% by weight to about 30% by weight of a plant-based polyol. In a related embodiment, the plant-based polyol is derived from sugarcane. In yet another related embodiment, the at least 75% by weight polyethylene is substantially all recycled polyethylene.

During the extrusion process, different additives can be added to the resin 106 such as flame retardants (e.g., aluminum hydroxide, aluminum trihydrate, magnesium hydroxide, and/or magnesium trihydrate), anti-microbial agents (e.g., norfloxacin, kanamycin, ethidium bromide), nucleating agents (e.g., aluminum powder and/or talcum powder), and colorants (e.g., a color concentrate from the same material as the base resin for compatibility such as REMAFIN available from Clariant Specialty Chemicals). The molten polyethylene 106 is then sent through a screen 110 which preferably has a screen ratio of about 20/40/20. The polyethylene then passes through a die 112 with a small slot-shaped opening where the extruded resin exits the extruder 102 as a foam 114 and is combined with a blowing agent such as, for example, isobutane. The foam 114 expands with the introduction of the blowing agent (step 202) to a density ranging from about 1 lb./ft$^3$ to about 1.5 lb./ft$^3$. The foam 114 is then allowed to cool and after the foam 114 has cooled to below about 170° F., the foam can be cut into smaller pieces (step 204). The optimum cross section of the polyolefin foam 114 as it exits the die 112 during extrusion is a 1.5 inch by 49-inch sheet 116, although these values can vary. Cutting can be performed using a band saw and the foam is preferably cut into lengths of about 120 inches resulting in a preferred sheet size of 1.5 inches×49 inches×120 inches.

The polyolefin foam 114 continues to cool as it is preferably run for hundreds of feet in a post extrusion cooling step 206, and as it does, the cross section of the extrusion continues to stabilize and off gas the blowing agent. The off-gassing process typically takes between 3-14 days depending on the size of the extruded profile and the exact type of blowing agent that is used. A hardened skin forms on the outside of the foam as it exits the extruder and cools off. The stabilization process means that the physical properties of the foam will achieve an equilibrium and are consistent across the entire area where such foam is used as a pad. One example of such properties in an embodiment of the foam pads described herein is shown in Table 2 above. The consistent and reliable nature of extruded polyolefin foam once it has stabilized and cooled and cured, (where substantially all the blowing agent has off gassed) make it ideal for a protective layer used in outdoor underlayment applications where an artificial turf is desired and where there will be collisions/falls with the ground by either people or objects like golf balls. Because the extruded foam has consistent homogeneous physical properties throughout the foam, such pads provide a predictable level of repeatable energy absorption across pads used in an entire installation that may cover acres of physical area.

The 1.5-inch×49-inch×120-inch sheets 116 can be cut to a final size on a bandsaw or a hot wire machine (step 208). When a 5-foot-wide and 16-foot-long hot wire machine is used, 30 sheets 116 at a time can be cut to an accurate final width and length of 1.5 inches×48 inches×60 inches to form a foam pad such as the foam pad 100 shown in FIG. 1. A typical hot wire machine for use with this manufacturing process preferably has an outer metal rectangular frame 52 inches wide by 168 inches long with three wires attached across the width and also two wires across the length. An electrical current is run through rails located on both the length and the width of the frame, then the wires heat up due to slight electrical resistance. The heat in the wires (e.g., 250° F.) will allow the wires to melt through and cut polyolefin foam when the metal frame is lowered, and the wires pass through a stack of 30 sheets of polyolefin foam that sit on a table that the metal frame can come to rest upon. Cutting a table load of foam sheets preferably begins with the metal frame bring raised to a maximum height of about 36 inches, then 30 sheets of 1.5 inch×49 inch×120 inch foam are loaded onto the table, the electrical current is turned on and passed through the wires, then the metal frame is lowered and the heated wires cut through the polyolefin foam leaving 60 sheets of 1.5 inch×48 inch×60 inch foam pads 100. These sheets are ready for installation as underlayment for an artificial turf sports field, playground, or yard application.

The 1.5 inch×48 inch×60 inch pads can be combined with a nonwoven layer of polyethylene terephthalate (PET) scrim (e.g., 48 inches×60 inches of 0.3 millimeter thickness, a basis weight of 68 grams per square meter (gsm), sorptive capacity of 288 ml/m$^2$, rate [drop disappearance MTD] less than 0.8 seconds) using hot melt adhesive from, for example, a Valco Melton model H20T hot melt glue machine and Jowat 245.55 glue to adhere the nonwoven layer to the polyolefin foam pad (step 212). The processing temp for the hot melt glue machine preferably ranges from about 320° F. to about 360° F. at 7.9 lbs. per gallon. The nonwoven layer can provide additional protection such as, for example, inhibiting the growth of weeds through drain holes. Foam pads can be produced in standard sheets of manageable size (such as, for example, 1.5-inch×48-inch×60-inch sheet). Such sizes are efficient to deliver from a production site to an application site. Pads can be placed and efficiently installed without the need for any special equipment or heavy handling equipment.

Regarding drainage holes 118, the foam pads may also be manufactured to provide a wide variation of customized drainage capacity depending on the specific end user requirements. Customized drainage holes can be fabricated in a wide variety of shapes including circles, squares, stars, and other shapes using, for example, a hydraulic die press with a steel rule die to punch the holes or a CNC router to drill the holes. The drainage holes can be placed in a proper pattern such as, for example, 0.5-inch diameter holes spaced 15 inches apart and drilled using a four head Heian 431P 2613 CNC router machine that can be set up using 0.5-inch diameter drill bits in each of the four heads. The CNC machine can then be programmed to cut a pattern of 20 holes, five rows of four holes spaced evenly every 15 inches where this frequency of holes will also allow the polyolefin foam layer 114 to maintain a consistent absorption of energy and continue to pass ASTM F1292 tests (step 214). Drainage rates of at least 35 gallons per square yard per hour (gal/yd$^2$/hr.) and preferably greater than 45 gal/yd$^2$/hr. can be achieved with certain configurations of drainage holes. Drainage holes have diameters as large as up to about 0.75 inches.

The process of extruding polyolefin foam provides a finished raw material that possesses consistent physical properties that can be measured and repeated from production run to production run. The physical properties are consistent throughout an entire production run. Consistent repeatable physical properties are critical since this material is used where injuries to children at play or for athletes competing in sporting activities can be prevented or avoided due to softened collisions with the ground.

In some embodiments, 0.5-inch-thick sheets of foam are extruded then multiple 0.5-inch sheets are laminated together in a secondary process where the ultimate thickness of 1.5 inches is achieved (step 210). The lamination process combines two sheets by running them parallel to each other in rollers preferably separated by a distance of about 0.25 inches where hot air (e.g., about 700° F.) is blown between the sheets of polyolefin foam. The hot air causes the surface of the polyolefin foam to melt and then the two sheets are fed into a single roller on top and bottom of both sheets so both sheets are fused into one as they are forced together. The heated foam surface cools and the two sheets form a weld in between the two layers. This resulting one-inch-thick sheet is then laminated through the same equipment one more time adding another 0.5-inch sheet to make a final thickness of 1.5 inches.

Multiple materials were tested to be used to create foam pads that meet the standards of embodiments of the foam pads described herein including urethane, polyvinyl chloride, nitrile rubber, recycled crumb rubber, polystyrene, polyester foams, SBR foams, latex-based foams, and polyethylene open cell foams. However, the only candidate that provided consistent satisfactory test results for both ASTM F1292-17 and ASTM D3575-08 was closed cell polyethylene. Certain embodiments of the foam pad described herein can be produced from bio-based resins which are produced from ethanol derived from a biological source such as, for example, sugar cane. Although foam pads described herein preferably come in standard shapes, unlike composite pads made form an assortment of different materials, the foam pads describe herein can be easily cut using, for example, a box knife, fine toothed saw blade or a hacksaw blade. Round holes, scallops, contours, and difficult edge trimmings applied to the foam pads described herein are easily handled without the use of power equipment.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible considering the above teachings. The embodiments are chosen and described to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A foam pad comprising a pad having a density ranging from about 0.5 pound per cubic foot (lb./ft$^3$) and about 4 lb./ft$^3$, a thickness ranging from about 0.5 inches to about 3 inches, and an HIC rating of less than 1000 and a G-max rating of less than 200 based on ASTM F1292-17 at a maximum fall height of from about 9 feet to about 12 feet.

2. The foam pad of claim 1 wherein the pad has a composition of at least 95% by weight polyethylene.

3. The foam pad of claim 1 wherein the pad has a composition of at least 70% by weight polyethylene and from about 20% by weight to about 30% by weight of a member selected from the group consisting of a plant-based polyol, crosslinked polypropylene, and combinations thereof.

4. The foam pad of claim 3 wherein more than 50% by weight of the polyethylene is recycled polyethylene.

5. The foam pad of claim 1 wherein the maximum fall height used with ASTM F1292-17 testing is at least 10 feet.

6. The foam pad of claim 1 wherein the pad has a density ranging from about 1.25 lb./ft$^3$ to about 1.75 lb./ft$^3$.

7. The foam pad of claim 1 further comprising a plurality of drainage holes extending through the thickness of the foam pad wherein the drainage rate of the pad is at least 35 gallons per square yard per hour.

8. The foam pad of claim 1 wherein the thickness loss of the pad at approximately one hour after removal of a 75 lb./in.$^2$ load applied to the pad at 25% deflection for approximately one hour pursuant to ASTM D3575-08 Suffix B is less than 7%.

9. A method of making a foam pad according to claim 1 for use under an activity surface, the method comprising the steps of:
   a. extruding a composition comprising at least 70% by weight of a polyolefin or combination of polyolefins through a die to form foam;
   b. adding a blowing agent to the foam so that the foam expands to a thickness of from about 0.5 inches to about 3 inches and a width ranging from about 45 inches to about 55 inches and wherein the expanded foam has a density ranging from about 0.5 lb./ft$^3$ to about 4 lb./ft$^3$;
   c. cooling the foam; and
   d. cutting the foam to form a foam sheet having a length ranging from about 100 inches to about 140 inches.

10. The method of claim 9 wherein the extruded composition comprises at least about 95% polyethylene, wherein the expanded foam is cut to a length ranging from about 110 inches to about 130 inches, wherein the foam expands to a thickness of from about 1 inch to about 2 inches, and wherein the expanded foam has a density ranging from about 1 lb./ft$^3$ to about 2 lb./ft$^3$.

11. The method of claim 9 wherein the extruded composition is heated to a maximum temperature of from about 380° F. to about 400° F. and then the resulting foam is cooled to less than about 170° F. prior to cutting.

12. The method of claim 9 wherein the extruded composition comprises at least 70% by weight polyethylene and from about 20% by weight to about 30% by weight of a member selected from the group consisting of a plant-based polyol, crosslinked polypropylene, a crosslinked polyethylene and combinations thereof.

13. The method of claim 9 further comprising the step of cutting the foam sheet to a length of from about 50 inches to about 70 inches to form a first foam pad and a second foam pad.

14. The method of claim 13 further comprising the step of laminating the first foam pad to the second foam pad.

15. The method of claim 13 further comprising the step of drilling a plurality of drainage holes through at least one of the foam pads.

16. The method of claim 13 further comprising the step of combining a nonwoven layer to the first foam pad, the second foam pad, or both the second foam pad and the second foam pad.

\* \* \* \* \*